(12) United States Patent
 Challiyil

(10) Patent No.: US 12,164,558 B2
(45) Date of Patent: *Dec. 10, 2024

(54) SAMPLING TECHNIQUE FOR DATA CLUSTERING

(71) Applicant: Microsoft Technology Licensing, LLC, Redmond, WA (US)

(72) Inventor: Suresh Challiyil, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,856

(22) Filed: Sep. 27, 2023

(65) Prior Publication Data

US 2024/0020332 A1    Jan. 18, 2024

Related U.S. Application Data

(63) Continuation of application No. 17/843,557, filed on Jun. 17, 2022, now Pat. No. 11,816,148.

(51) Int. Cl.
 *G06F 16/55* (2019.01)
 *G06V 10/82* (2022.01)
 (Continued)

(52) U.S. Cl.
 CPC .............. *G06F 16/55* (2019.01); *G06V 10/82* (2022.01); *G06V 20/40* (2022.01); *G06V 40/167* (2022.01);
 (Continued)

(58) Field of Classification Search
 CPC ....... G06F 16/55; G06F 18/231; G06V 10/82; G06V 20/40; G06V 40/167; G06V 40/168; G06V 40/172
 See application file for complete search history.

(56) References Cited

U.S. PATENT DOCUMENTS 11,151,386 B1    10/2021    Aggarwal et al.
2017/0103264 A1*  4/2017    Javan Roshtkhari .. G06V 20/49
 (Continued)

OTHER PUBLICATIONS

Kavitha et al., "Evaluation of Distance Measures for Feature based Image Registration using AlexNet", IJACSA, vol. 9, No. 10, pp. 284-290 (Year: 2018).*

(Continued)

*Primary Examiner* — Jared M Bibbee
(74) *Attorney, Agent, or Firm* — Klarquist Sparkman, LLP

(57) ABSTRACT

Techniques and solutions are described for clustering, with reduced memory consumption, observations in a data set. A first observation is received. A distance is determined between the first observation and a first cluster. It is determined that the distance satisfies a threshold, and the first observation is added to a first sample of the first cluster. A first set of means is calculated for the first sample using data of the first observations and data of at least a second observation of the first sample. A second set of means is calculated for the plurality of elements for the first cluster using the first set of means for the first sample and at least a third set of means for at least a second sample of the first cluster. An identifier of the first observation is added to a collection of observation identifiers classified in the first cluster.

20 Claims, 12 Drawing Sheets

(51) Int. Cl.
  *G06V 20/40* (2022.01)
  *G06V 40/16* (2022.01)
  *G06F 18/231* (2023.01)

(52) U.S. Cl.
  CPC .......... *G06V 40/168* (2022.01); *G06V 40/172* (2022.01); *G06F 18/231* (2023.01)

(56) References Cited

U.S. PATENT DOCUMENTS

| | | | |
|---|---|---|---|
| 2019/0163806 A1* | 5/2019 | Bauer | G06F 16/285 |
| 2019/0188223 A1* | 6/2019 | De Sheng Deng | G06F 16/55 |
| 2020/0104643 A1* | 4/2020 | Hu | G06N 3/045 |
| 2020/0342630 A1* | 10/2020 | Elmoznino | G06T 11/00 |
| 2020/0380245 A1* | 12/2020 | Nowozin | G06V 20/30 |
| 2021/0382936 A1* | 12/2021 | Tomar | G06N 20/00 |
| 2022/0121884 A1* | 4/2022 | Zadeh | G06N 3/043 |

OTHER PUBLICATIONS

U.S. Appl. No. 17/843,557, filed Jun. 17, 2022.
Narita, et al., "Incremental Clustering for Hierarchical Clustering", in 5th International Conference on Computational Science/Intelligence and Applied Informatics, Jul. 10, 2018, pp. 102-107.
"International Search Report and Written Opinion Issued in PCT Application No. PCT/US23/022871", Mailed Date: Sep. 1, 2023, 12 Pages.

* cited by examiner

404 — Cluster 1 Center = (4, 17, 1, 4)
418 — Cluster 2 Center = (8, 4, 9, 17)
408 — Cluster 1 Mean Vector Sample 1 = (3, 15, 1, 2)
410 — Cluster 1 Mean Vector Sample 2 = (5, 19, 1, 6)
414 — Cluster 1 Observation 1: (5, 19, 1, 6)
422 — Observation = (1, 20, 3, 5)
426 — Distance between Observation and Cluster 1: 4.8
        Distance between Observation and Cluster 2: 22
428 — Cluster 1 Mean Vector Sample 2 (updated) = (3, 20, 2, 6)
432 — Cluster 1 Mean Vector Sample 2 (updated) = (3, 18, 2, 4)
436 — Cluster 1 Center (updated) = (3, 18, 2, 4)

FIG. 4

```
'''
Implementation of estimation of population mean
1. Create samples of observations,
2. Calculate the mean of each sample(sample mean),
3. Calculate the mean of sample means, i.e. cluster mean.
4. Mean of the sample means is the representative embedding we are going to use for each face.
'''
def __point_estimate_population_mean_embedding__(self, observ):    # observ is embedding
    observ_embedding_nparr = observ['Embedding'].squeeze(axis = 0)
    lowest_distance_index = None
    distance = None

Calculate the distance of the embedding from a matrix which has means of all the clusters.
    if (self.means_mat is not None):
        distances = self.__calculate_distance_indices__(observ_embedding_nparr)
        lowest_distance_index, distance = np.argmin(distances), distances[np.argmin(distances)]

Find the cluster which is nearest to the current embedding
    if distance is not None and distance < self.distance_threshold:

# Current(active) sample is the one we must add the embedding into.
        cluster = self.face_groups[lowest_distance_index]
        sample_list = cluster['Samples']
        cur_sample = sample_list[-1]

# We take the max number of samples as 35 and recalculate the sample mean
        # If the number of observations in the sample is < 35
        if (len(cur_sample['Observations']) < self.observations_threshold):
            cur_sample['Observations'].append(observ)

Recalculate the sample mean
            all_embeddings = np.zeros((1, 1, self.embedding_size))
            for item in cur_sample['Observations']:
                all_embeddings = np.concatenate((all_embeddings, item['Embedding']), axis = 0)

all_embeddings = all_embeddings[1:]
            cur_sample['Mean'] = np.mean(all_embeddings, axis = 0, keepdims=True)
```

FIG. 7A

```
If the number of observations in the sample == 35
else:
    ## Delete all the observations of that sample. We don't need them, we have the mean.
    self.__delete_observations_from_sample__(cur_sample, lowest_distance_index)

# Create a new sample, new mean = observation mean, variance = 0
    sample = {'Observations':[], 'Mean':observ['Embedding']}
    sample['Observations'].append(observ)
    sample_list.append(sample)

# Recalculate the cluster mean = sample1 mean + sample2 mean +... sampleN mean
cluster_data = np.zeros((1, 1, self.embedding_size))
for sample in sample_list:
    cluster_data = np.concatenate((cluster_data, sample['Mean']), axis = 0)

cluster_data = cluster_data[1:]
cluster['Mean'] = np.mean(cluster_data, axis = 0, keepdims = True)

self.__update_clusters_mean_matrix__(lowest_distance_index, cluster['Mean'])

else:
    sample_list = []
    sample = {'Observations':[], 'Mean':observ['Embedding']}
    sample['Observations'].append(observ)
    sample_list.append(sample)

cluster = {'Mean':sample['Mean'], 'Frames':[], 'Samples':sample_list}
    self.face_groups.append(cluster)

self.__update_clusters_mean_matrix__(None, cluster['Mean'])
```

FIG. 7B

SAMPLING TECHNIQUE FOR DATA CLUSTERING

CROSS REFERENCE TO RELATED APPLICATIONS

This application is a continuation of U.S. patent application Ser. No. 17/843,557, filed on Jun. 17, 2022, which is hereby incorporated herein by reference.

FIELD

The present disclosure generally relates to data clustering techniques. Particular implementations provide for defining clusters using summary information for data observations included in a cluster.

BACKGROUND

There are a variety of scenarios where it can be of interest to determine what portions of a video contain a particular element, such as human face. For instance, in security applications, it may be useful to review camera footage to identify portions of the footage that include images of a particular person. Manually scanning the camera footage can be time consuming, tedious, and error prone. As another example, streaming video content is becoming increasing popular. It can be of benefit to provide users with more information about video content, or to allow users to interact with video content that may not have been practical in other media formats.

Video processing techniques can be very time consuming and require significant amounts of processor time. For example, analyzing a video for the presence of a particular individual can require thousands of video samples to be stored and analyzed. In the case of a streaming movie, consider an average movie that has a running time of two hours and is presented at a frame rate of 24 frames/second. This content contains 172,800 frames. In turn, processing each frame can generate many values to be stored and processed. In the case of facial recognition techniques, faces may be detected in a given frame, and then facial features may be extracted using a vector of 128 or 512 elements. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for clustering observations in a data set. A first observation is received. A distance is determined between the first observation and a first cluster. It is determined that the distance satisfies a threshold, and the first observation is added to a first sample of the first cluster. A first set of means is calculated for the first sample using data of the first observations and data of at least a second observation of the first sample. A second set of means is calculated for the plurality of elements for the first cluster using the first set of means for the first sample and at least a third set of means for at least a second sample of the first cluster. An identifier of the first observation is added to a collection of observation identifiers classified in the first cluster. The use of samples, serving as summary information for individual operations classified within the first cluster, reduces memory consumption as compared with calculating the second set of means using data for discrete observations classified within the first cluster.

In one aspect, a clustering method is provided. A first observation instance is received for a set of input data. The first observation instance includes a first plurality of values for a respective plurality of elements of the set of input data. The first plurality of values for the plurality of elements describe a feature of interest in a set of input data.

A distance between the first observation and a first cluster of samples is determined, the samples having a location determined using observations classified within the first cluster. It is determined that the distance satisfies a threshold. Based on the determining that the distance satisfies the threshold, the first observation is added to a first sample associated with the first cluster.

For the first sample, a first set of means is calculated for the plurality of elements using the first plurality of values for the first observation and at least a second plurality of values for the plurality of elements for at least a second observation in the first sample. A second set of means is calculated for the plurality of elements for the cluster using the first set of means for the first cluster and at least a third set of means for at least second sample associated with the first cluster. The use of samples, serving as summary information for individual observations classified within the first cluster, thereby reduces memory consumption as compared with calculating the second of set of means using data for discrete observations classified within the first cluster. Based on the determining that the distance satisfies the threshold, an identifier of the first observation is added to a collection of observation identifiers classified in the first cluster.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 provides mathematical details for an example of how observation summary information can be used in clustering operations.

FIGS. 7A and 7B present code for an example implementation of disclosed techniques.

DETAILED DESCRIPTION

Example 1—Overview

Figure 1:
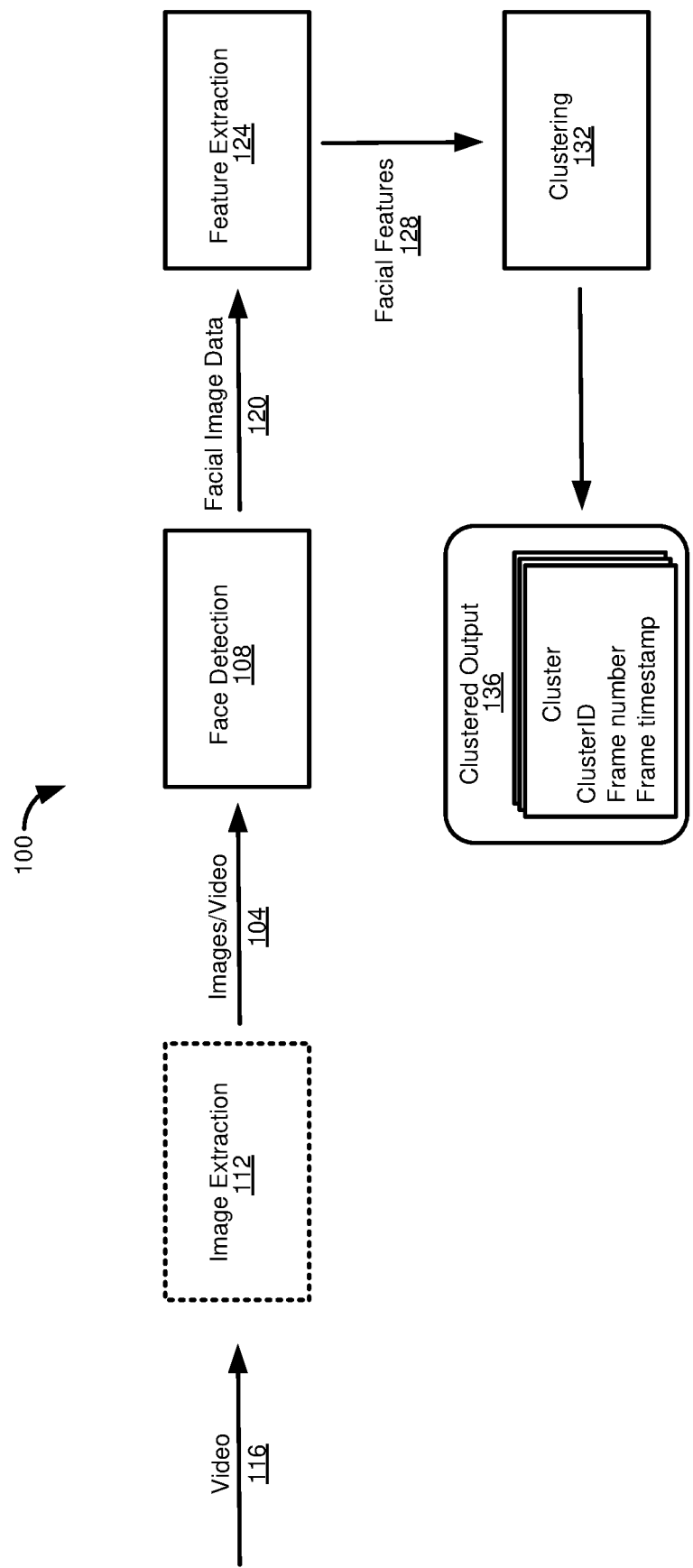
FIG. 1 is a diagram illustrating a processing pipeline for clustering image data.

There are a variety of scenarios where it can be of interest to determine what portions of a video contain a particular element, such as human face. For instance, in security applications, it may be useful to review camera footage to identify portions of the footage that include images of a particular person. Manually scanning the camera footage can be time consuming, tedious, and error prone. As another example, streaming video content is becoming increasing popular. It can be of benefit to provide users with more information about video content, or to allow users to interact with video content that may not have been practical in other media formats.

Video processing techniques can be very time consuming and require significant amounts of processor time. For example, analyzing a video for the presence of a particular individual can require thousands of video samples to be stored and analyzed. In the case of a streaming movie, consider an average movie that has a running time of two hours and is presented at a frame rate of 24 frames/second. This content contains 172,800 frames. In turn, processing each frame can generate many values to be stored and processed. In the case of facial recognition techniques, faces may be detected in a given frame, and then facial features may be extracted using a vector of 128 or 512 elements. Accordingly, room for improvement exists.

Disclosed technologies provide for improved image recognition and clustering, including techniques that reduce processing times and resources. For example, a sampling technique is provided where a number of observations, such as image frames, are assigned to samples (where each sample is a set of observations) associated with different feature clusters, where a feature cluster can represent a distinct image element, such as a particular human being (and in particular, based on facial images for the particular human being). Once a determined number of elements have been received for a given sample, mean values for observations in the sample are stored, and data for the individual observations is deleted. Observation identifiers, such as an identifier of a particular image/video frame, can be maintained in a list of observations associated with a particular cluster. This process can then be repeated as additional observations are assigned to various samples of the various clusters.

Techniques are also provided to determine when new clusters should be formed, and when clusters should be consolidated. For example, an observation can be analyzed to determine whether it is sufficiently "close" to an existing cluster, such as using a Euclidian distance for a vector of values associated with the observation and a vector associated with a given cluster, such as a vector representing the centroid of the cluster. If the observation is not within a determined distance, or other measure of "closeness," a new cluster can be created for the observation.

In the case of merging clusters, the centroids of two clusters can be analyzed to determine whether they are sufficiently close to satisfy merge criteria, such as having a Euclidian distance between their centroids that is less than a threshold amount. If so, the clusters can be merged, including defining a centroid for the merged cluster and combining lists of observations associated with the clusters being merged. In at least some cases, merge operations are conducted after observation clustering has completed, or completed to a desired degree, as it may be difficult to split a cluster into multiple clusters.

Various data used in the disclosed techniques can be maintained in suitable computer-implemented constructs. For example, the input data set, clusters, samples, and observations can be maintained in data structures (such as stacks, queues, graphs, heaps, trees, etc.), or maintained in instance of data types (such as vectors, or instances of abstract or complex data types).

Although disclosed technologies can find use in a variety of settings, a particular example is provided to illustrate how disclosed technologies can be used. In the example, a movie is to be analyzed to determine particular actors or actresses present in the movie. The end result of the processing is clusters corresponding to particular actors or actresses, and a list of frames of the moving falling within one of those clusters.

Frames of the movie can be extracted as individual images. The images can be processed using face detection techniques. Images corresponding to particular faces in a given image can then be processed using a feature extraction technique to obtain a set of data describing the face in the given image portion. The set of data is then compared with a set of clusters being built and modified during the "training" (processing of the movie). If a given facial image has data sufficiently similar to an existing cluster, it can be added to a list of observations associated with the cluster (and thus is identified as a frame containing the actor or actress associated with the cluster), and data associated with the cluster can be recalculated.

Taking a particular cluster for a particular actor or actress, a center of the cluster can be defined, such as based on samples that have been classified as belonging to the cluster. As new observations are added to a sample, the values of the sample, and the definition of the center of the cluster, can be modified. Once a sample reaches a determined number of samples, the data for individual observations (images) in the sample is removed, and only summary information for the sample remains, such as the average values of the observations that were originally in the sample (or the medoid for higher-dimensional data).

The list of frames in a particular cluster can be used for a variety of purposes, including to provide users with a list of times segments of a movie that feature a particular actor or actress. In some implementations, a user can select to view one of these segments, where a first frame in a set of contiguous frames can be used as a starting point for video playback. A portion of the movie, such as in a streaming video file, corresponding to a selected time window can be provided in response to a user request.

In another example, surveillance video can be processed as described for the movie scenario described above. An image of a person of interest can be compared with the clusters to determine whether the image falls within a cluster—indicating that the person of interest is in the processed surveillance video. A user can then be provided with a list of times/time windows in the video where the person of interest appears.

Disclosed technologies can provide a number of advantages. As the clustering technique is dynamic, a number of clusters can be determined at runtime. With video of unknown content, it can be difficult to determine a static number of clusters in advance of image processing. However, clustering is also tunable, in that a distance parameter can be adjusted to determine when clusters should be merged, or to determine when a new cluster should be created when an observation distance does not fall within a threshold distance of an existing cluster.

Disclosed technologies also use reduced memory compared with techniques that maintain or use all observation data, since only sample mean information (serving as summary information for observations classified within a given cluster) is maintained, and not individual observation data, once a sample size has been reached. Both memory and processor resources are conserved since a number of calculations used to calculate sample means a mean (centroid) of a cluster is limited to a set sample size (as opposed to, for example, using all individual observations in a cluster to calculate its centroid), where a new sample is created once the set of sample observations is full. As a consequence, a given observation is only used a maximum number of times equal to the maximum number of observations in a sample. This can be of benefit compared with techniques that may use observation data until results converge or a determined number of iterations is met that is not bounded by a sample size. Similarly, while calculations for given clusters may continue until processing of a data set is complete, processing observations in sets of samples helps reduce the processing load, such as by an amount corresponding to a determined size of a sample. Since the number of computations can be significantly reduced, disclosed techniques can allow for faster processing, processing using less powerful hardware, or for processing datasets that might be too large to be practically handled using other techniques.

Example 2—Example Processing Pipeline for Image Feature Clustering

FIG. 1 illustrates an example end-to-end processing scenario 100 in which disclosed techniques can be used. While the processing scenario 100 will be described with respect to image/video data, it should be appreciated that disclosed techniques, in particular disclosed clustering techniques, can be used in other kinds of data processing.

Image or video information 104 is provided to a face detection component 108. In some cases, the face detection component 108 uses images, rather than video. In this case, a processing step can involve extracting images at 112 from video input 116, where the extracted images are provided to the face detection component 108.

The face detection component 108 can perform one or both of detecting faces in an image and extracting detected faces from an image. In this context, "detecting" a face refers to determining that a portion of an image corresponds to a face, not determining an identity associated with the face or otherwise providing any information about what the face represents, or if the face is related to any other faces that might have been extracted. Suitable techniques for facial detection include multi-task cascaded convolutional neural networks (MTCNN), including as described by Zhang, et al., "Joint Face Detection and alignment using Multi-Task Cascaded Convolutional Networks," arXiv 1604.02878 (2016). Additional face detection techniques are described in Hasan, et al., "Human Face Detection Techniques: A Comprehensive Review and Future Research Directions," Electronics, 10:2354 (2021).

The output of the face detection component 108 is facial image data 120, which can be a portion of an image corresponded to a detected face, or an overall image in which a face appears, but where locations of the face in the image are provided along with the overall image. The facial image data 120 is processed by a feature extraction component 124. The feature extraction component 124 provides facial features data 128 (or embeddings) as output, which describe properties of a facial image, and which can be used to compare different facial images. Note that while the facial features data 128 can be used for face recognition, is the disclosed techniques it can be used for clustering facial images regardless of when or if the facial features data is correlated with a known face/identity.

Various techniques can be used as, or as part of, the face extraction component 124. One suitable technique is described in Schroff, et al., "FaceNet: A Unified Embedding for Face Recognition and Clustering," arXiv 1503.03832 (2015). Additional techniques that can be used to generate embedding include Ageitgey (https://github.com/ageitgey/face_recognition), CompreFace (Exadel, Inc), DeepFace (https://github.com/serengil/deepface), InsightFace (https://github.com/deepinsight/insightface), and InsightFace-REST (https://github.com/SthPhoenix/InsightFace-REST), Rekognition (Amazon.com, Inc.), and Face API (Microsoft Corp.). While many feature extraction components provide embeddings using machine learning techniques (including using deep neural networks), the present disclosure is not limited to such techniques. In particular, the facial features data 128 can be latent features (such as produced using a convolutional neural network) or can be non-latent features (for example, directly describing features such as distances between different facial features, locations of various facial anchor points, etc.).

Suitable techniques exist for both face detection and feature extraction, including the Mobile Vision API from Google, Inc., now included in the ML Kit from Google, Inc.

The facial features data 128 is provided to a clustering component 132, where the clustering component can use techniques described in the present disclosure. The clustering component 132 provides clustered output 136. The clustered output 136 can include a variety of information, depending on the specific use case. Typically, the clustered output 136 includes, for clusters determined from processing input images/video 104, a cluster identifier and information about video frames/images that contain an image falling within the cluster. The frame/image information can include a frame number/image identifier.

In the case of video (or a timeseries of images), the clustered output 136 can include information regarding times or time windows containing a given image (face), where time windows can be defined based on consecutive frames/images falling within a particular cluster, or using other criteria. In some cases, rules can be applied to help define time windows. That is, a given face, corresponding to a particular individual (such as an actor or actress), can occur many times within a given time window, but may not appear in all frames of the time window. Criteria can be used to determine when a window should be opened or closed, such as defining a new window if a face within a given cluster does not appear within a certain time of a prior instance of the face. It should be noted that frames/images can have multiple faces, or frames/images within a particular time segment can include multiple faces. Thus, a given "window" need not be associated with a single face, and windows can optionally be configured to overlap.

Although not shown in FIG. 1, the clustered output 136 can include additional information, such as data used to define a cluster, including data defining a centroid of a cluster and information used to calculate the centroid, such as information for various samples.

Example 3—Example Clustering Technique Using Observation Summary Information

Figure 2A:
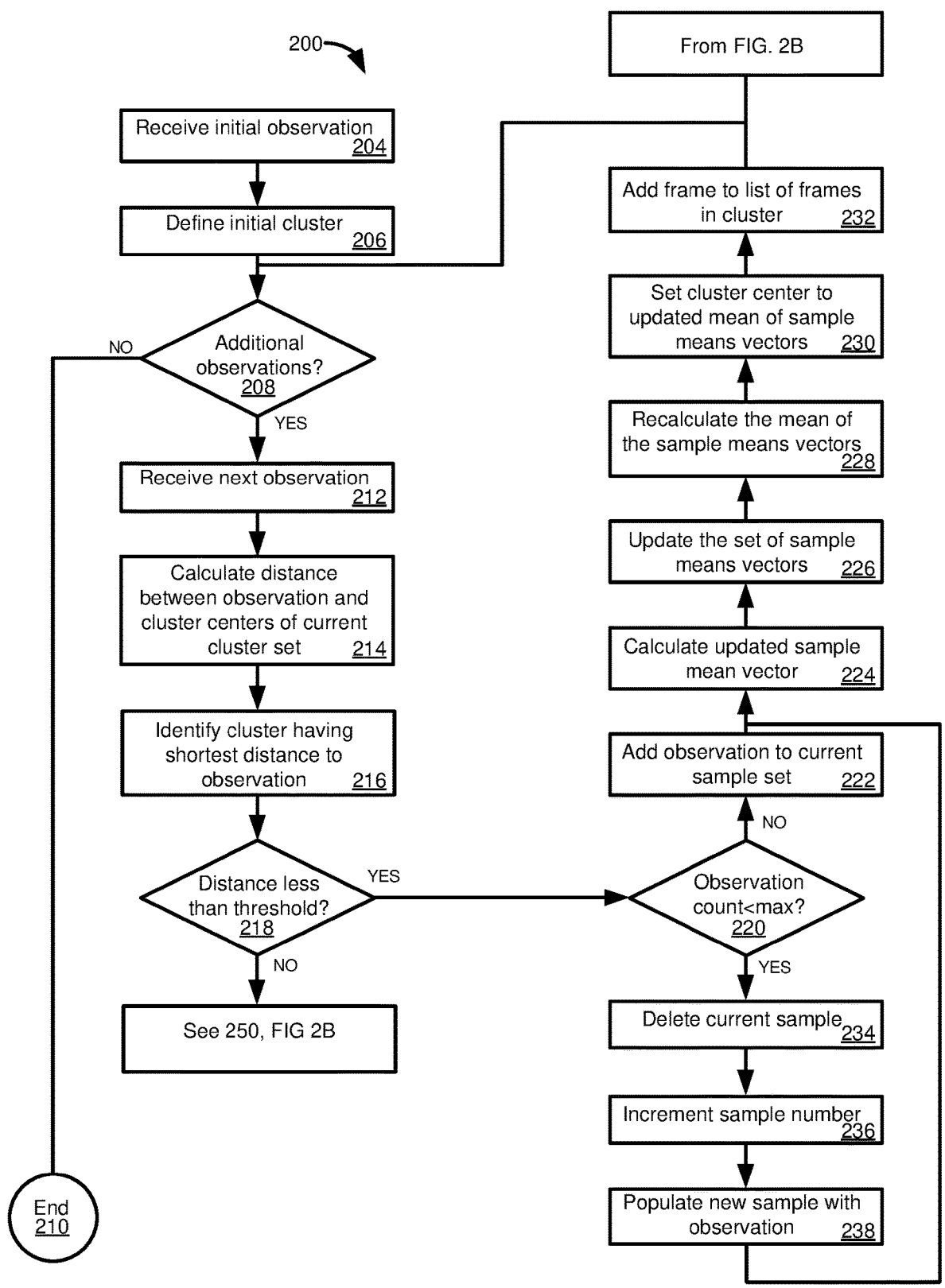
FIGS. 2A and 2B present a flowchart of a clustering technique that uses observation summary information.
Figure 2B:
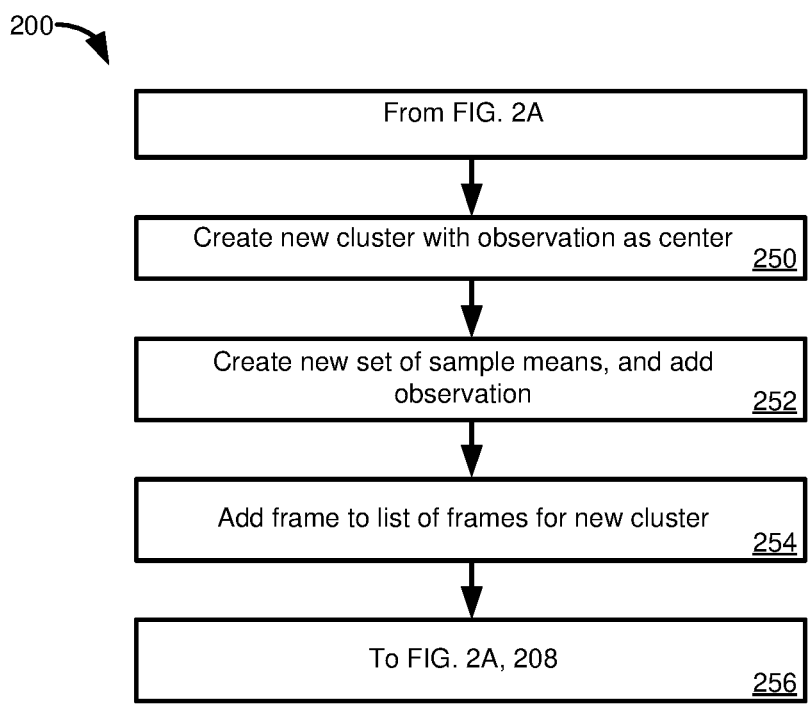

FIGS. 2A and 2B illustrates an example process 200 according to the present disclosure for clustering data, and in particular video data (either as video or as a series of extracted images). The Law of Large Numbers states that the mean of many independent samples has a high probability of being close to the mean of the underlying distribution from which the samples are taken. Similarly, a density histogram of many independent samples has a high probability of being close to the density histogram of the underlying distribution from which the sample is taken. Generally, as the number of independent samples increases, the closer the sample mean and density histograms will be to the underlying distribution—values that may be calculated using all of the underlying data, not simply a set of samples. In many cases, the Law of Large Numbers provides good results even for samples of modest size, such as sets having around 30 samples.

Disclosed techniques take advantage of the implications of the Law of Large Numbers to collect observations (images/video frames) in samples that have a (typically fixed or static) size such that the mean of the sample is a good surrogate for the individual vales of the observations (frames/images) in the set. In some cases, the Law of Large Numbers can be applied at multiple levels, such as being used to define a size of a sample, and to define a number of observations to be analyzed within a larger pool of observations. For example, a sample can be defined as having 30 samples, and the 30 samples can be drawn from a larger pool of samples. In the case of video running at 30 frames/second, it could be that only 30 frames are sampled over a period of five seconds.

For ease of presentation, this Example 3 proceeds with the presumption that it is being used with a previously discussed use case—the clustering of video frames/images into clusters that represent particular actors or actresses, although the techniques can be used in other applications. Mathematically, a set of clusters C can be defined as C={$\overline{c_1}, \overline{c_2}, \overline{c_3}$, . . . }|C|=0, at time t=0, where $\overline{c_i}$ is the cluster mean vector for cluster i, and where the cluster mean vector describes the centroid of the cluster. In the specific example, $\overline{c_i}$ represents an embedding for the $i^{th}$ actor or actress, which can be defined as $$\overline{c_i} = \frac{1}{|s_{c_i}|} \sum_{j=1}^{|s_{c_i}|} \overline{s_j}$$

where $\overline{s_j}$ is the sample mean vector of the $j_{th}$ cluster of a given set of samples S for a given cluster i.

As discussed, each sample is based on a particular number of samples up to a maximum of n, where the value of n can be adjusted as described, but is typically selected as described above using the implications of the Law of Large Numbers.

A sample mean vector $\overline{s_j}$ for a given sample of a set of sample S can be calculated as $$\overline{s_j} = \frac{1}{|N|} \sum_{k=1}^{|N|} o_k,$$

where N is the number of observations, o, (and N less than or equal to n), and where |N|=0 at time t=0, and where $o_k$ is facial recognition data (embeddings) for a particular observation, typically provided in the form of a vector. Note that the sample mean vectors also include the embeddings, with each element of the sample mean vector corresponding to a mean value for a particular embedding calculated from the corresponding embedding elements of the observations in the sample. Similarly, the cluster mean vectors have elements that are embeddings calculated from the corresponding element/embedding of the sample mean vectors.

Now, turning to the process 200, and in particular to FIG. 2A, the process starts at 204, where an initial observation is received. In the specific example described above, this observation is in the form of a vector, where each element of the vector provides a value corresponding to an embedding at the respective vector position. Common facial recognition techniques provide 128 different embeddings, which can be represented by a vector having 128 elements, one for each embedding.

Since the observation received at 204 is an initial observation, no clusters have yet been defined. Accordingly, an initial cluster is defined at 206. Although not shown in FIG. 2A, at this point the initial observation is assigned to a first sample for the initial cluster. The centroid/mean vectors for the cluster and the sample can be calculated, but at this point are equal to the initial observation.

At 208, it is determined if any additional observations have been provided or are available as input. If not, the process 200 can end at 210. Otherwise, the process 200 proceeds to 212, where a next observation is received. At this point, since a cluster exists, it needs to be determined whether the next observation should be placed in the existing cluster or in a new cluster. A distance is calculated at 214 between the observation and a current set of clusters—while there is only a single cluster for the second observations, there can be multiple clusters when the "next observation" is one that is being analyzed after many other observations have been processed. The distance can be calculated as a Euclidian distance, $d = \sqrt{(x_2-x_1)^2 + (y_2-y_1)^2 + (z_2-z_1)^2 + ...}$, wherein x, y, z, . . . are the elements/embeddings of the respective vectors.

At 216, a cluster is identified that has the shortest distance between the center of the cluster and the observation. It is determined at 218 whether that distance is less than a threshold distance, where the threshold distance can be adjusted to provide a desired result. Larger values for this distance threshold can increase the chances that different individuals will be classified in the same cluster, while smaller values can increase the chance of multiple clusters being created for a single individual. It is determined at 218 that the distance is not less than a threshold distance, the process 200 can proceed to 250 in FIG. 2B, otherwise, the observation is assigned to the nearest cluster and the process proceeds to 220.

At 220, it is determined whether a current sample for the cluster has a number of observations is less than a maximum number of observations set for cluster samples. If the number of observations is less than the threshold, the process 200 proceeds to 222, where the observation is added to a current sample. An updated sample mean vector is calculated at 224 (using the new observation and existing observations in the sample), and the recorded sample mean for the sample is updated at 226. Since the center of the cluster is calculated from the set of sample means vectors of the samples for the cluster, an updated cluster mean vector (representing the centroid of the cluster) is calculated at 228, which is used as the new cluster centroid at 230. At 232, the frame (or other identifier associated with the observation) is added to a list of frames associated with the cluster. The process 200 then returns to 208.

If it is determined at 220 that a current sample for the cluster has reached a maximum number of observations, the current sample is deleted at 234. That is, the summary information for the sample (its mean vector) is maintained, but the observations for the sample are deleted. Typically sample mean information is maintained on a sample-by-sample basis, and so it can be helpful to distinguish one sample (sample vector) from another. In some cases, this can include numbering the samples, in which case the sample number can optionally be incremented at 236. However, in other cases sample mean vectors can be maintained in a different manner, and 236 can simply represent proceeding with an empty/new sample. The empty sample is populated with the current observation at 238. The process 200 can then proceed to 222 (where the updated sample mean vector simply equals the vector for the observation).

Returning now to 216 where it was determined that the distance between the current observation and the closest cluster is not less than the threshold, turning to FIG. 2B, at 250, a new cluster is created with the observation vector set as the center (centroid) mean vector of the cluster. A new sample is created, and the observation is added to the sample (as the first element in the set of observations for the sample), where the observation vector is also set as the sample mean vector at 252. At 254 the frame (or other observation identifier) is added to a list of frames for the new cluster. At 256, the process returns to 208.

After the process 200 ends at 210, the set of sample mean vectors can be deleted, if desired. Similarly, the cluster center mean vectors can also be deleted, such if the clusters are not to be used to process further image data. That is, in some cases the fact that there are different clusters, and identifiers of frames/images associated with such clusters, are the primary information of interest.

Example 4—Example Merging of Clusters

As noted in Example 1, it can be beneficial to evaluate clusters to consider whether it would appropriate for any of them to be merged together. That is, as training/data evaluation progresses, clusters that were initially far enough apart to be considered separate clusters may have their centers shift such that they become close enough together that they would have originally been considered to be part of a common cluster. So, it could be that two clusters may have observations belonging to the same feature (that is, face, individual, etc.). The criteria for merging clusters can be the same distance used to determine whether an observation should be classified in an existing cluster, or a new cluster created, or different criteria can be used.

At least in some cases, it can be beneficial to conduct a merge analysis after data processing is complete, as it may not be possible to split a cluster. A downside is that additional memory/resources are used in maintaining samples for a cluster that could have been merged with another cluster, but typically the number of clusters is sufficiently low that this is not a major consideration. If desired, cluster merge operations can be conducted during processing of an input data set, but stricter criteria can be used to determine whether clusters should be merged. It can be, for example, that a remaining amount of data to be processed would not be expected to result in a merged cluster later not satisfying merge criteria.

Figure 3:
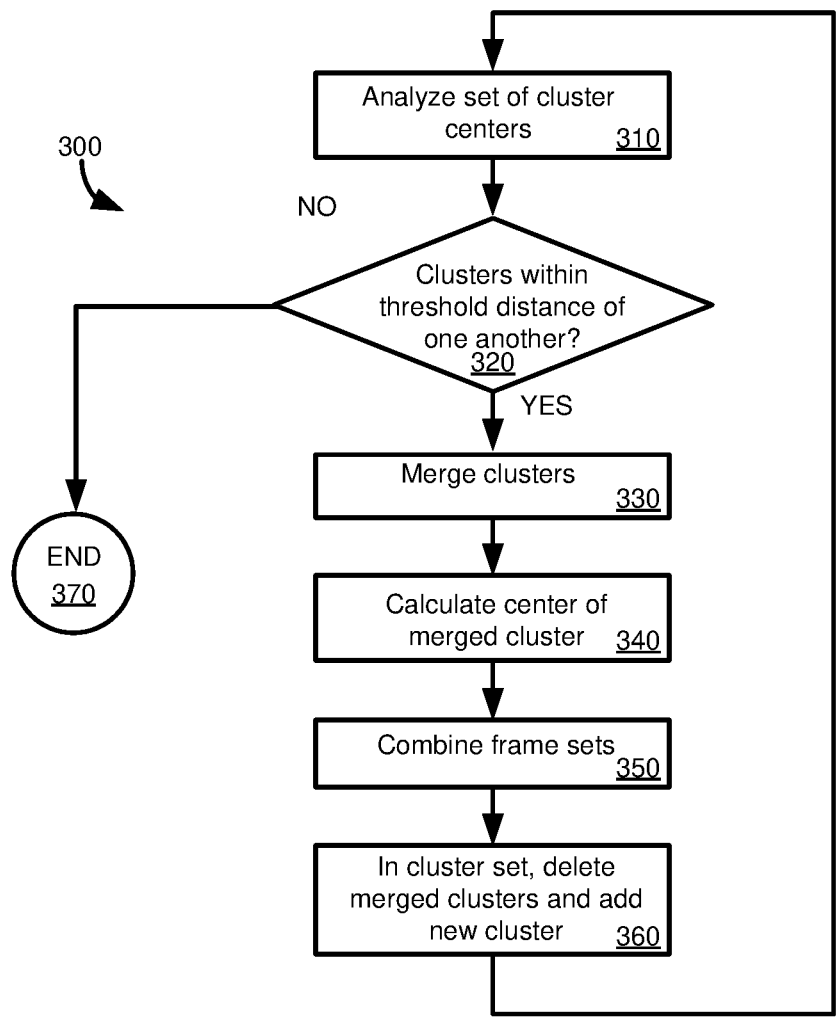
FIG. 3 present a flowchart of a method for determining whether clusters should be merged.

FIG. 3 illustrates an example merge analysis process 300 according to the present disclosure. At 310, a set of cluster centers is analyzed, such as determining distances between pairs of clusters in the set (where the distance can be calculated as described in Example 3). At 320, it is determined whether any pairs of clusters are within a threshold distance of each other. If not, the process 300 can end at 370, or it can loop at 310 (such as if the process is being carried as part of an ongoing process, such as the process 200 of FIG. 2).

If it is determined at 320 that two or more clusters are within a threshold distance of one another, such clusters can be merged at 330. At 340, the centers of the merged clusters can be calculated. In some cases, the center of a merged cluster is calculated as the mean of the centers of the clusters being merged. In other cases, the clusters can be weighted, such as based on a number of frames located in the clusters or a number of samples/observations in the clusters. If the sample data is available, the center of the merged cluster can be calculated using the sample mean vectors for the clusters being merged.

Frame sets/lists (or other indicators of observations falling within clusters being merged) are merged at 350. At 360, the original clusters that were merged are deleted, and the new merged cluster is added. The process 300 can then loop to 310, including to determine whether a cluster created by a merge operation can further merged with additional clusters.

Example 5—Example Calculations in Clustering Using Observation Summary Information FIG. 4 provides a concrete example of how the process 200 can be implemented. In FIG. 4, two clusters have already been identified, where a first cluster has a center as defined at line 404, and has two sample mean vectors 408, 410 for respective first and second samples. The first sample is "full," while the second sample has a single observation 414. The second cluster has a center defined at line 418.

A next observation 422 is received. Distances are calculated between the observation 422 and the mean vector 404 for first cluster and the mean vector 418 for the second cluster, with the results being shown at lines 426, 428. It can be seen that the observation 422 is closer to the first cluster 404 than the second cluster 418. Assume that a distance has been set where an observation will be added to its closest cluster so long as its distance is less than six. In this case, the distance between the observation 422 and the first cluster 404 is 4.8, which satisfies the threshold. Accordingly, the observation 422 is added to the first cluster, and in particular is added to the second sample 410 (assuming that a sample can have a maximum of thirty observations, the second sample, only having a single observation, can accept additional observations).

After adding the observation 422 to the second sample 410, the mean vector of the second sample is recalculated by taking the mean of the vector elements of the first and second observations, on an element-by-element basis, to provide the updated sample mean vector shown at line 432. The updated center of the first cluster can then be recalculated by taking the average of the sample mean vector for the first sample and the updated sample mean vector for the second sample, to provide the updated center (centroid) mean vector 436 for the first cluster. It can be seen that the centroid of the first cluster has moved slightly as a result of addition of the observation 422 to the cluster.

Example 6—Example Cluster Information

Figure 5:
FIG. 5 is diagram illustrating information that can be maintained for clusters associated with image data.

FIG. 5 illustrates cluster information that can be produced using disclosed techniques, such as using the process 200 of FIG. 2. FIG. 5 includes three clusters 505, 510, 515, which can correspond to different actors or actresses in a movie. Each cluster 505, 510, 515 includes an identifier 520, a list of frames 525 that were identified as belonging to the cluster (and which were used in defining the cluster), a vector 530 definition the centroid of the cluster, and a set of sample mean vectors 535.

Example 7—Example Relationships Between Observations, Samples, and Clusters

Figure 6:
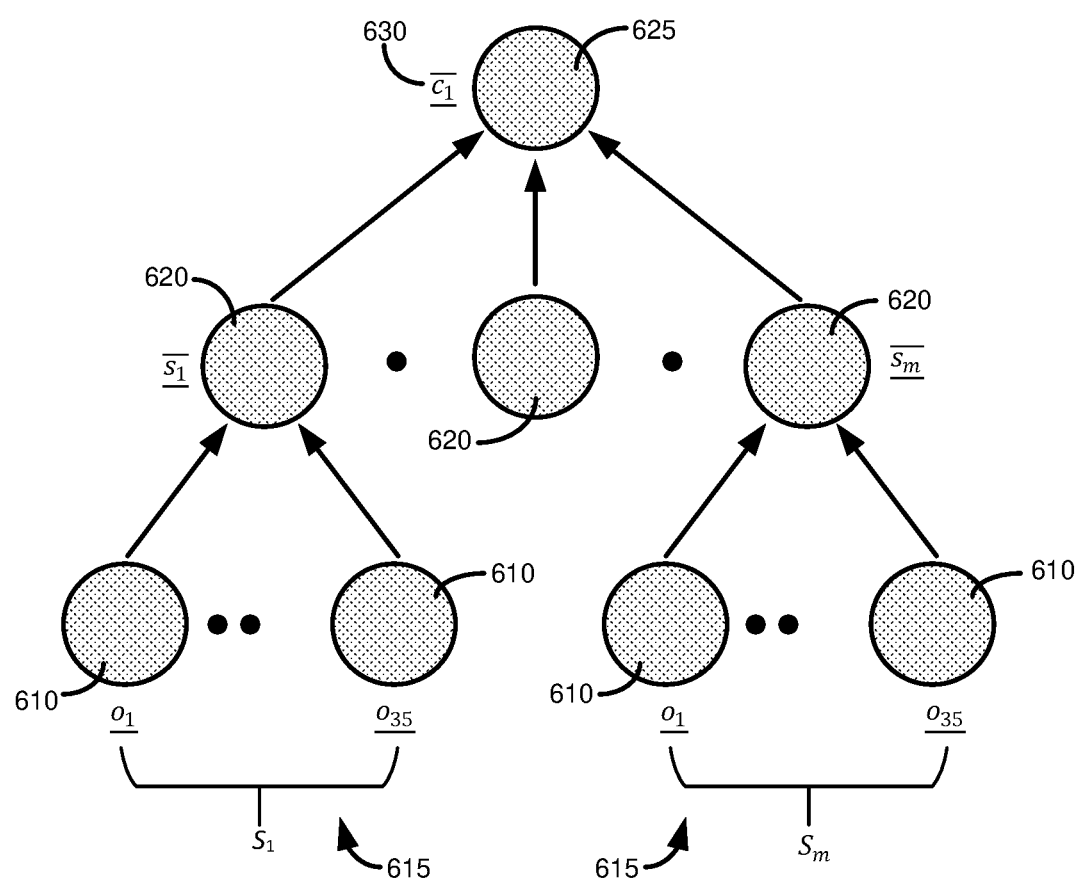
FIG. 6 is a diagram illustrating relationships between observations, samples, and clusters.

FIG. 6 provides a diagram that further illustrates the relationships between observations, samples, and clusters. It can be seen that a plurality of observations vectors 610 are included in respective samples (Si, S m) 615, and are used to form sample mean vectors 620. As has been described, once a sample reaches a determined number of observations, data for the observation vectors 610 can be discarded, and the sample means vectors 620 can be used for operations for their respective clusters.

FIG. 6 also illustrates how the sample means vectors 620 can be used to define a cluster 625, including a mean vector 630 that defines the center (centroid) of the cluster.

Example 8—Example Code Implementation

FIGS. 7A and 7B provide example code 700 that can be used to implement disclosed techniques.

Example 9—Example Clustering Operations

Figure 8:
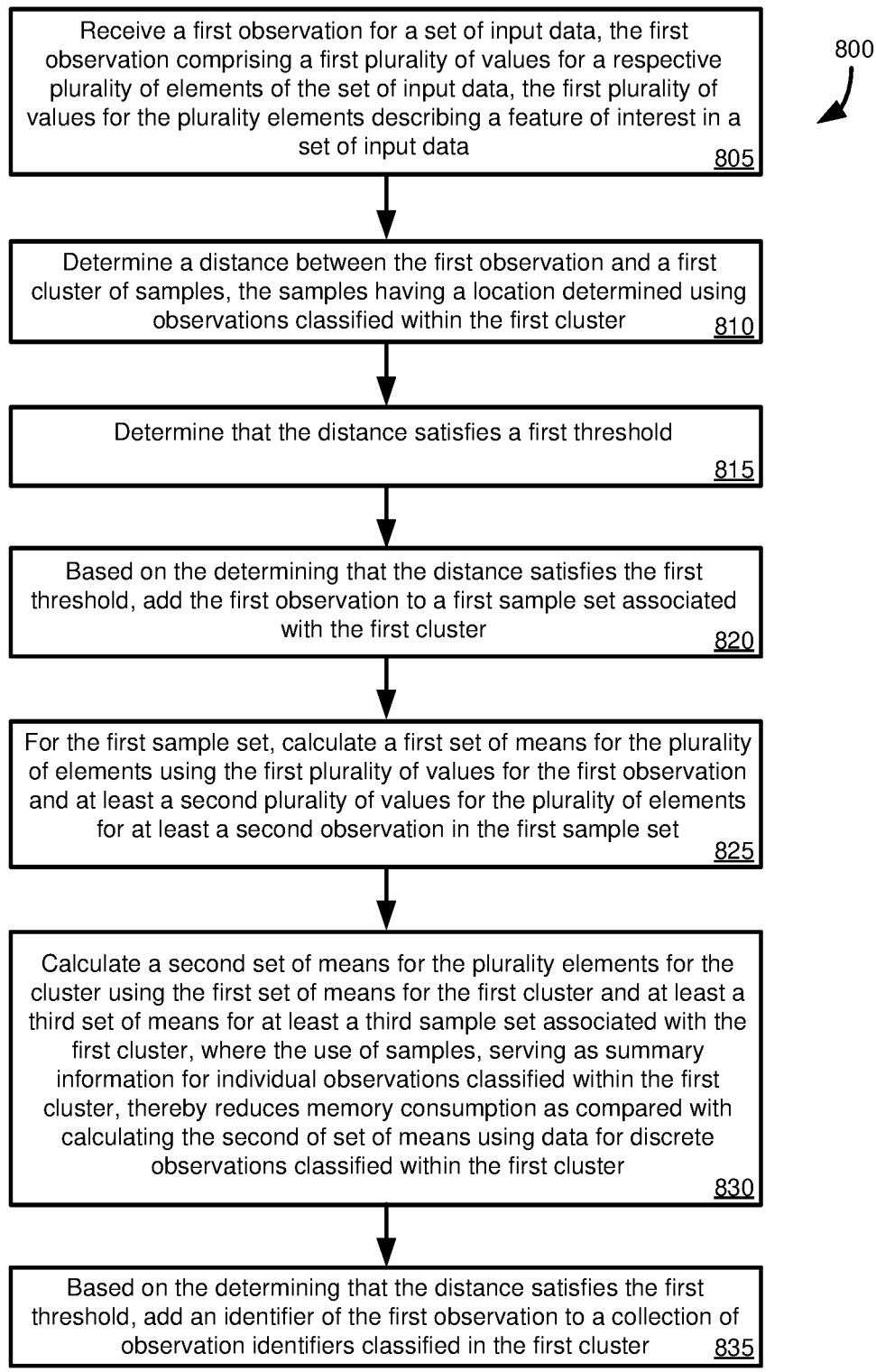
FIG. 8 is a flowchart of example clustering operations according to an embodiment of the present disclosure.

FIG. 8 is a flowchart of a clustering method 800 according to the present disclosure. The method includes operations that reduce memory consumption during feature clustering. At 805, a first observation for a set of input data is received. The first observation instance includes a first plurality of values for a respective plurality of elements of the set of input data. The first plurality of values for the plurality of elements describe a feature of interest in a set of input data.

A distance between the first observation and a first cluster of samples is determined at 810, where the samples have a location determined using observations classified within the first cluster. At 815, it is determined that the distance satisfies a threshold. Based on the determining that the distance satisfies the threshold, at 820, the first observation is added to a first sample associated with the first cluster.

At 825, for the first sample, a first set of means is calculated for the plurality of elements using the first plurality of values for the first observation and at least a second plurality of values for the plurality of elements for at least a second observation in the first sample. A second set of means is calculated at 830 for the plurality of elements for the cluster using the first set of means for the first cluster and at least a third set of means for at least second sample associated with the first cluster, where the use of samples that serve as summary information for individual observations classified within the first cluster thereby reduces memory consumption as compared with calculating the second of set of means using data for discrete observations classified within the first cluster. Based on the determining that the distance satisfies the first threshold, an identifier of the first observation is added to a collection of observation identifiers classified in the first cluster at 835.

Example 10—Additional Examples

Example 1 is a computing system that includes at least one memory and at least one hardware processor coupled to the at least one memory. The computing system further includes one or more computer-readable storage media storing computer executable instructions that, when executed, cause the computing system to perform various operations, where the operations reduce memory consuming during feature clustering. The operations include receiving a first observation for a set of input data. The first observation includes a first plurality of values for a respective plurality of elements of the set of input data. The first plurality of values for the plurality of elements describe a feature of interest in a set of input data.

A distance between the first observation and a first cluster of samples is determined, the samples having a location determined using observations classified within the first cluster. It is determined that the distance satisfies a first threshold. Based on the determining that the distance satisfies the first threshold, the first observation is added to a first sample associated with the first cluster.

For the first sample, a first set of means is calculated for the plurality of elements using the first plurality of values for the first observation and at least a second plurality of values for the plurality of elements for at least a second observation in the first sample. A second set of means is calculated at 830 for the plurality of elements for the cluster using the first set of means for the first cluster and at least a third set of means for at least second sample associated with the first cluster, where the use of samples serving as summary information for individual observations classified within the first cluster thereby reduces memory consumption as compared with calculating the second of set of means using data for discrete observations classified within the first cluster. Based on the determining that the distance satisfies the first threshold, an identifier of the first observation is added to a collection of observation identifiers classified in the first cluster.

Example 2 includes the subject matter of Example 1, and further specifies that observation location data is not maintained for observations associated with the at least a second sample.

Example 3 includes the subject matter of Example 1 or Example 2, and further specifies additional operations. The additional operations include receiving a third observation that includes a third plurality of values for the plurality of elements. A distance is determined between the third observation and the first cluster. It is determined that the distance between the third observation and the first cluster satisfies the first threshold. It is determined that the first set of means includes a number of observations satisfying a second threshold. Based on determining that the first set of means includes a number of observations satisfying the second threshold, a third set of means is created for a third sample associated with the first cluster. A set of means for the plurality of elements for the third sample is set to the third plurality of values. An updated set of samples means is calculated for the plurality of elements for the first cluster using the first set of means, the second set of means, and the third set of means. An identifier of the third observation is added to a collection of observation identifiers classified in the first cluster.

Example 4 includes the subject matter of Example 3, and further specifies that second threshold is selected to provide a desired probability that the first set of means calculated from observations in the first sample is representative of the observations in the first sample.

Example 5 includes the subject matter of Example 3 or Example 4, and further specifies second threshold is at least thirty observations.

Example 6 includes the subject matter of any of Example 1 or Example 2, and further specifies determining that adding the first observation to the first sample results in the first sample satisfying a threshold number of observations. After calculating the first set of means, data is deleted for observations of the first sample.

Example 7 includes the subject matter of Example 6, and further specifies that the threshold number of observations is selected to provide a desired probability that the first set of means calculated from observations in the first sample is representative of observations in the first sample.

Example 8 includes the subject matter of Example 7, and further specifies that the threshold number of observations is at least thirty observations.

Example 9 includes the subject matter of any of Examples 1-8, and further specifies determining a distance between the first observation and a second cluster. It is determined that the distance between the first observation and the first cluster is less than the distance between the first observation and the second cluster.

Example 10 includes the subject matter of any of Examples 1-9, and further specifies receiving a set of image data. A face is detected in the set of image data. Data is generated, describing the face, from the image data, where at least a portion of the data describing the face, or data derived at least in part therefrom, is included within the first observation.

Example 11 includes the subject matter of Example 10, and further specifies that the set of image data corresponds to a sample of a streaming video file.

Example 12 includes the subject matter of Example 11, and further specifies extracting the set of image data from the streaming video file.

Example 13 includes the subject matter of any of Examples 1-12, and further specifies outputting identifiers of observations classified in the first cluster, or data associated therewith.

Example 14 includes the subject matter of any of Examples 1-13, and further specifies that observations classified in the first cluster correspond to a portion of a video file. Timestamps are output that are associated with observations of the first cluster.

Examples 15 includes the subject matter of any of Examples 1-14, and further specifies determining a distance between the first cluster and a second cluster. It is determined that the distance between the first cluster and the second cluster satisfies a threshold. The first and second clusters are merged.

Example 16 includes the subject matter of any of Examples 1-15, and further specifies receiving a third observation that includes a third plurality of values for the plurality of elements. A distance is determined between the third observation and the first cluster. It is determined that the distance between the third observation and the first cluster does not satisfy a threshold. A second cluster is created. The third observation is added to the second cluster.

Example 17 includes the subject matter of any of Examples 1-16, and further specifies that the first set of means includes a vector, wherein a given element of the vector corresponds to a mean calculated at least in part from a corresponding element of a vector for the first observation and a corresponding element of a vector for the at least a second observation.

Example 18 includes the subject matter of any of Examples 1-17, and further specifies that the distance is calculated as the Euclidian distance of a vector representing the first observation and a vector representing a center of the first cluster.

Example 19 includes the subject matter of Example 14, and further specifies that at least one time window is generated from output timestamps associated with observations of the first cluster. A request to view a portion of the streaming video file correspond to the at least one time window is received. The portion of the streaming video file is sent to a client in response to the request.

Example 20 is one or more computer-readable media storing computer-executable instructions that, when executed, cause the computing system to perform various operations that reduce memory consuming during feature clustering. The operations include receiving a first observation instance for a set of input data. The first observation instance includes a first plurality of values for a respective plurality of elements of the set of input data. The first plurality of values for the plurality of elements describe a feature of interest in a set of input data.

A distance between the first observation and a first cluster of samples is determined, the samples having a location determined using observations classified within the first cluster. It is determined that the distance satisfies a first threshold. Based on the determining that the distance satisfies the first threshold, the first observation is added to a first sample associated with the first cluster.

For the first sample, a first set of means is calculated for the plurality of elements using the first plurality of values for the first observation and at least a second plurality of values for the plurality of elements for at least a second observation in the first sample. A second set of means is calculated at 830 for the plurality of elements for the cluster using the first set of means for the first cluster and at least a third set of means for at least second sample associated with the first cluster, where the use of samples, serving as summary information for individual observations classified within the first cluster, thereby reduces memory consumption as compared with calculating the second of set of means using data for discrete observations classified within the first cluster. Based on the determining that the distance satisfies the first threshold, an identifier of the first observation is added to a collection of observation identifiers classified in the first cluster. Additional Examples include the subject matter of Example 20 and that of any of Examples 2-19, in the form of computer-executable instructions.

Example 21 is a method that can be implemented in hardware, software, or a combination thereof. The method includes operations that reduce memory consuming during feature clustering. A first observation instance is received for a set of input data. The first observation instance includes a first plurality of values for a respective plurality of elements of the set of input data. The first plurality of values for the plurality of elements describe a feature of interest in a set of input data.

A distance between the first observation and a first cluster of samples is determined, the samples having a location determined using observations classified within the first cluster. It is determined that the distance satisfies a first threshold. Based on the determining that the distance satisfies the first threshold, the first observation is added to a first sample associated with the first cluster.

For the first sample, a first set of means is calculated for the plurality of elements using the first plurality of values for the first observation and at least a second plurality of values for the plurality of elements for at least a second observation in the first sample. A second set of means is calculated at 830 for the plurality of elements for the cluster using the first set of means for the first cluster and at least a third set of means for at least second sample associated with the first cluster. Based on the determining that the distance satisfies the first threshold, an identifier of the first observation is added to a collection of observation identifiers classified in the first cluster, where the use of samples, serving as summary information for individual observations classified within the first cluster, thereby reduces memory consumption as compared with calculating the second of set of means using data for discrete observations classified within the first cluster. Additional Examples include the subject matter of Example 21 and that of any of Examples 2-19, in the form of additional elements of the method.

Example 11—Computing Systems

Figure 9:
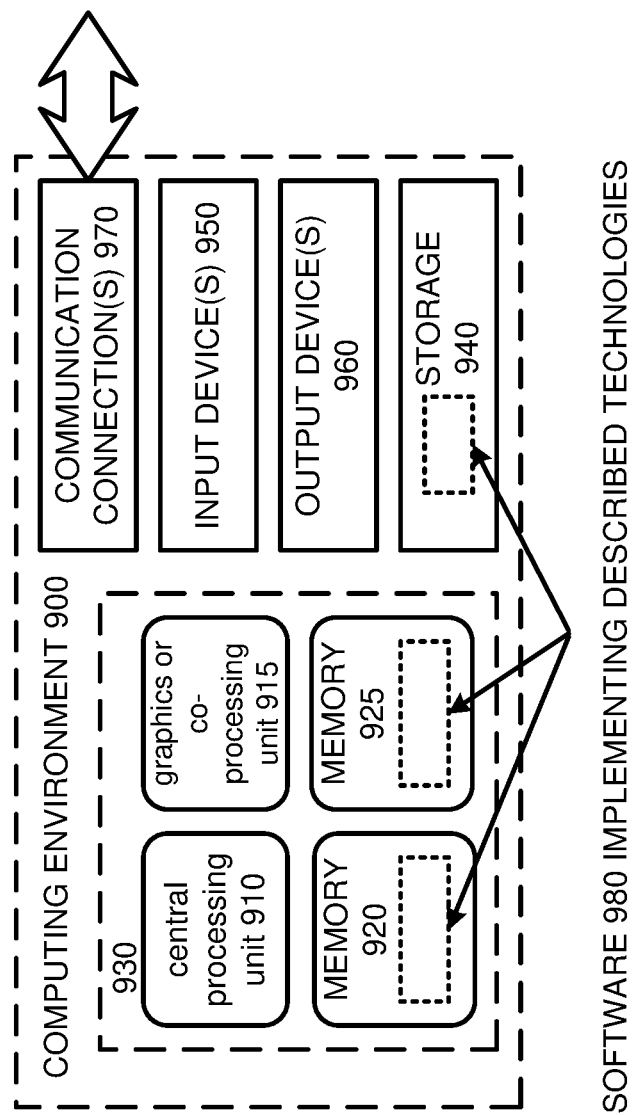
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900. The storage 940 stores instructions for the software 980 implementing one or more innovations described herein, including those described in Examples 1-10.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 10:
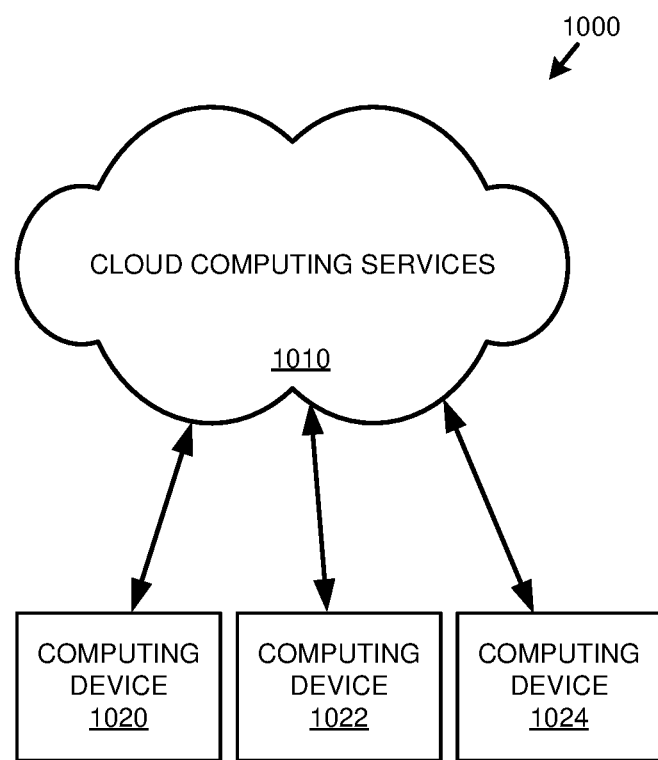
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media comprising computer-executable instructions that, when executed, cause the computing system to perform operations that reduce memory consuming during feature clustering, the operations comprising:
   receiving a first image for a set of input images, the first image comprising a first plurality of values for a respective plurality of elements, the first plurality of values describing an object of interest in the set of input images;
   determining a distance between the first image and a first cluster of samples, the samples having a location determined using observations classified within the first cluster;
   determining that the distance satisfies a first threshold;
   based on the determining that the distance satisfies the first threshold, adding the first image to a first sample associated with the first cluster;
   for the first sample, calculating a first set of arithmetic mean values for the plurality of elements using the first plurality of values for the first image and at least a second plurality of values for the plurality of elements for at least a second image in the first sample;
   calculating a second set of arithmetic mean values for the plurality of elements for the first cluster using the first set of arithmetic mean values for the first sample and at least a third set of arithmetic mean values for at least a second sample associated with the first cluster, wherein the use of samples, serving as summary information for individual images classified within the first cluster, thereby reduces memory consumption as compared with calculating the second of set of arithmetic mean values using data for discrete images classified within the first cluster; and based on the determining that the distance satisfies the first threshold, adding an identifier of the first image to a collection of image identifiers classified in the first cluster.

2. The computing system of claim 1, wherein the object is a face of a particular individual.

3. The computing system of claim 2, wherein the plurality of elements correspond to facial embeddings.

4. The computing system of claim 2, wherein the collection of image identifiers correspond to time segments in which images of the individual appear in a video file.

5. The computing system of claim 4, the operations further comprising:
receiving user input selecting a time segment; and
initiating playback of the video file from the selected time segment.

6. The computing system of claim 4, wherein a time segment is defined at least in part based on a number of times the face is identified in a series of images of the set of input images over a time frame.

7. The computing system of claim 4, wherein a beginning of a time segment is based on a threshold number of occurrents of the face within a time frame.

8. The computing system of claim 4, wherein a time segment is closed if a threshold period of time passes without the occurrence of the face in an image of the set of input images.

9. The computing system of claim 2, the operations further comprising:
rendering for display an identifier of the individual and identifiers of time segments comprising images of the individual in the collection of image identifiers.

10. The computing system of claim 1, the operations further comprising:
detecting a face in the set of input images; and
generating data describing the face from the image data, wherein at least a portion of the data describing the face, or data derived at least in part therefrom, is comprised within the first image.

11. The computing system of claim 1, wherein the set of input images corresponds to a sample of a streaming video file.

12. The computing system of claim 11, the operations further comprising:
extracting the set of image images from the streaming video file.

13. A method, implemented in a computing system comprising at least one hardware processor and at least one memory coupled to the at least one hardware processor, the method comprising operations that reduce memory consuming during feature clustering, the operations, the method comprising:
receiving a first image for a set of input images, the first image comprising a first plurality of values for a respective plurality of elements, the first plurality of values describing an object of interest in the set of input images;

determining a distance between the first image and a first cluster of samples, the samples having a location determined using observations classified within the first cluster;
determining that the distance satisfies a first threshold;
based on the determining that the distance satisfies the first threshold, adding the first image to a first sample associated with the first cluster;
for the first sample, calculating a first set of arithmetic mean values for the plurality of elements using the first plurality of values for the first image and at least a second plurality of values for the plurality of elements for at least a second image in the first sample;
calculating a second set of arithmetic mean values for the plurality of elements for the first cluster using the first set of arithmetic mean values for the first sample and at least a third set of arithmetic mean values for at least a second sample associated with the first cluster, wherein the use of samples, serving as summary information for individual images classified within the first cluster, thereby reduces memory consumption as compared with calculating the second of set of arithmetic mean values using data for discrete images classified within the first cluster; and
based on the determining that the distance satisfies the first threshold, adding an identifier of the first image to a collection of image identifiers classified in the first cluster.

14. The computing system of claim 13, wherein in the object is a face of a particular individual.

15. The computing system of claim 14, wherein the plurality of elements correspond to facial embeddings.

16. The computing system of claim 14, wherein the collection of image identifiers correspond to time segments in which images of the individual appear in a video file.

17. The computing system of claim 6, the operations further comprising:
receiving user input selecting a time segment; and
initiating playback of the video file from the selected time segment.

18. One or more computer-readable storage media comprising:
computer-executable instructions that, when executed by a computing system comprising at least one hardware processor and at least one memory coupled to the at least one hardware processor, cause the computing system to receive a first image for a set of input images, the first image comprising a first plurality of values for a respective plurality of elements, the first plurality of values describing an object of interest in the set of input images;
computing-executable instructions that, when executed by the computing system, cause the computing system to determine a distance between the first image and a first cluster of samples, the samples having a location determined using observations classified within the first cluster;
computing-executable instructions that, when executed by the computing system, cause the computing system to determine that the distance satisfies a first threshold;
computing-executable instructions that, when executed by the computing system, cause the computing system to, based on the determining that the distance satisfies the first threshold, add the first image to a first sample associated with the first cluster;
computing-executable instructions that, when executed by the computing system, cause the computing system to, for the first sample, calculate a first set of arithmetic mean values for the plurality of elements using the first plurality of values for the first image and at least a second plurality of values for the plurality of elements for at least a second image in the first sample;

computing-executable instructions that, when executed by the computing system, cause the computing system to calculate a second set of arithmetic mean values for the plurality of elements for the first cluster using the first set of arithmetic mean values for the first sample and at least a third set of arithmetic mean values for at least a second sample associated with the first cluster, wherein the use of samples, serving as summary information for individual images classified within the first cluster, thereby reduces memory consumption as compared with calculating the second of set of arithmetic mean values using data for discrete images classified within the first cluster; and computing-executable instructions that, when executed by the computing system, cause the computing system to, based on the determining that the distance satisfies the first threshold, add an identifier of the first image to a collection of image identifiers classified in the first cluster.

19. The one or more computer-readable storage media of claim 18, wherein the object is a face of a particular individual.

20. The one or more computer-readable storage media of claim 19, further comprising:

computing-executable instructions that, when executed by the computing system, cause the computing system to render for display an identifier of the individual and identifiers of time segments comprising images of the individual in the collection of image identifiers.

* * * * *